US012781439B2

(12) United States Patent
Bormashenko et al.

(10) Patent No.: US 12,781,439 B2
(45) Date of Patent: Nov. 3, 2026

(54) METHOD OF PREPARING PLANT-DERIVED MATERIAL

(71) Applicant: Ariel Scientific Innovations Ltd., Ariel (IL)

(72) Inventors: Edward Bormashenko, Ariel (IL); Yelena Bormashenko, Ariel (IL); Yaakov Anker, Salit (IL)

(73) Assignee: Ariel Scientific Innovations Ltd., Ariel (IL)

( * ) Notice: Subject to any disclaimer, the term of this patent is extended or adjusted under 35 U.S.C. 154(b) by 167 days.

(21) Appl. No.: 18/008,713

(22) PCT Filed: Jun. 7, 2021

(86) PCT No.: PCT/IL2021/050680

§ 371 (c)(1),
(2) Date: Dec. 7, 2022

(87) PCT Pub. No.: WO2021/250658

PCT Pub. Date: Dec. 16, 2021

(65) Prior Publication Data

US 2023/0220631 A1 Jul. 13, 2023

Related U.S. Application Data

(60) Provisional application No. 63/035,787, filed on Jun. 7, 2020.

(51) Int. Cl.
*D21J 1/08* (2006.01)
*B27K 5/00* (2006.01)
(Continued)

(52) U.S. Cl.
CPC ................ *D21J 1/08* (2013.01); *B27K 5/001* (2013.01); *B27K 5/003* (2013.01); *B27K 5/007* (2013.01);
(Continued)

(58) Field of Classification Search
CPC ........ B27K 5/001; B27K 5/003; B27K 5/007; B27K 2240/70; B27K 2200/15;
(Continued)

(56) References Cited

U.S. PATENT DOCUMENTS 6,818,102 B1 11/2004 Viol
8,815,113 B2 * 8/2014 Kostova ............... C08K 5/0066 252/607
(Continued)

FOREIGN PATENT DOCUMENTS

CN 107009478 8/2017
CN 107009478 A * 8/2017 ............ B27K 5/002
(Continued)

OTHER PUBLICATIONS

Machine Translation (MT) of CN 107009478 A. (Year: 2017).*
(Continued)

*Primary Examiner* — Jose A Fortuna

(57) ABSTRACT

A method of preparing a fiberboard is described herein, the method comprising treating a particulate plant-derived material with plasma to obtain a plasma-treated particulate material, and compressing the plasma-treated particulate material. Further described herein is a fiberboard comprising a particulate plant-derived material, and being substantially devoid of an adhesive, or substantially devoid of an adhesive which is urea-formaldehyde resin, melamine-formaldehyde resin, polyurethane resin, epoxy resin, and/or phenol formaldehyde resin. The fiberboard may be characterized by a density of less than 500 kg/m$^3$, a particulate plant-derived material particle area of at least 1 mm$^2$, and/or a particulate plant-derived material water contact angle of no more than 20°.

13 Claims, 1 Drawing Sheet

(51) Int. Cl.
*B27N 3/00* (2006.01)
*B27N 3/02* (2006.01)
*B27N 7/00* (2006.01)
*C08L 63/00* (2006.01)
*C08L 97/02* (2006.01)

(52) U.S. Cl.
CPC ............... *B27N 3/007* (2013.01); *B27N 3/02* (2013.01); *B27N 7/005* (2013.01); *C08L 63/00* (2013.01); *C08L 97/02* (2013.01); *B27K 2240/70* (2013.01)

(58) Field of Classification Search
CPC . B27K 9/00; B27N 3/007; B27N 3/02; B27N 7/005; B27N 3/002; B27N 3/04; D21J 1/08; C08L 63/00; C08L 97/02
See application file for complete search history.

(56) References Cited

U.S. PATENT DOCUMENTS

| | | | | |
|---|---|---|---|---|
| 10,183,416 | B2 * | 1/2019 | Hand | B27N 3/18 |
| 10,414,064 | B1 * | 9/2019 | Laster | B27N 3/183 |
| 11,285,508 | B2 * | 3/2022 | Pervan | B05D 1/12 |
| 11,479,916 | B2 * | 10/2022 | Tilton | D21J 1/08 |
| 11,667,981 | B2 * | 6/2023 | Eyal | D21H 11/00 435/106 |
| 2004/0062920 | A1 * | 4/2004 | Guilbert | C08L 97/02 428/295.1 |
| 2008/0193785 | A1 * | 8/2008 | Kingma | C08L 97/02 427/317 |
| 2009/0317632 | A1 | 12/2009 | Ruhdorfer | |
| 2017/0106561 | A1 * | 4/2017 | Hand | B27N 3/18 |
| 2017/0226424 | A1 * | 8/2017 | Moon | B27K 3/0292 |
| 2019/0070747 | A1 * | 3/2019 | Pfeiffer | B27K 5/0085 |
| 2020/0399474 | A1 * | 12/2020 | Roumeli | C08L 101/16 |
| 2023/0220631 | A1 * | 7/2023 | Bormashenko | C08L 63/00 162/100 |
| 2023/0347547 | A1 * | 11/2023 | Losego | B27K 3/32 |
| 2024/0018359 | A1 * | 1/2024 | Roumeli | C08L 97/02 |

FOREIGN PATENT DOCUMENTS

| | | | | | |
|---|---|---|---|---|---|
| CN | 109605534 | | | 4/2019 | |
| CN | 118107029 | A | * | 5/2024 | B27K 5/00 |
| GB | 2511121 | B | * | 10/2017 | C08L 97/02 |
| KR | 100309418 | B1 | * | 12/2001 | B29C 65/00 |
| RU | 2033319 | | | 4/1995 | |
| RU | 2345886 | | | 2/2009 | |
| RU | 2627644 | | | 8/2017 | |
| WO | WO 2021/250658 | | | 12/2021 | |
| WO | WO-2021250658 | A1 | * | 12/2021 | B27K 5/001 |

OTHER PUBLICATIONS

International Preliminary Report on Patentability Dated Dec. 22, 2022 From the International Bureau of WIPO Re. Application No. PCT/IL2021/050680. (12 Pages).
International Search Report and the Written Opinion Dated Aug. 15, 2021 From the International Searching Authority Re. Application No. PCT/IL2021/050680. (17 Pages).
Abuarra et al. "Fabrication and Characterization of Gum Arabic Bonded *Rhizophora* Spp. Particleboards", Materials and Design, 60: 108-115, Available Online Mar. 28, 2014.
Acda et al. "Effects of Plasma Modification on Adhesion Properties of Wood", International Journal of Adhesion & Adhesives, 32: 70-75, Available Online Oct. 26, 2011.
Akinyemi et al. "Formaldehyde Free Particleboards From Wood Chip Wastes Using Glutaraldehyde Modified Cassava Starch as Binder", Case Studies in Construction Materials, 11: e00236-1-e00236-8, Dec. 2019.
Ciannamea et al. "Medium-Density Particleboards From Modified Rice Husks and Soybean Protein Concentrate-Based Adhesives", Bioresource Technology, 101(2): 818-825, Available Online Sep. 18, 2009.
Khosravi et al. "Protein-Based Adhesives for Particleboards", Industrial Crops and Products, 32(3): 275-283, Nov. 2010.
Kim et al. "A Study on the Effect of Plasma Treatment for Waste Wood Biocomposites", Journal of Nanomaterials, 2013(Art.ID 138083): Jan. 1-6, 2013.
Nakanishi et al. "Formaldehyde-Free Particleboards Using Natural Latex as the Polymeric Binder", Journal of Cleaner Production, 195: 1259-1269, Sep. 10, 2018.
Niro et al. "Development Of Medium- And Low-Density Fibreboards Made Of Coconut Husk And Bound With Tannin-Based Adhesives", International Wood Products Journal, 7(4):208-214, Dec. 13, 2016.
Peters et al. "Comparison of Three Dielectric Barrier Discharges Regarding Their Physical Characteristics and Influence on the Adhesion Properties on Maple, High Density Fiberboards and Wood Plastic Composite", Journal of Physics D: Applied Physics, 50(47): 475206-1-475206-10, Published Online Nov. 3, 2017 & Corrigendum, Journal of Physics D: Applied Physics, 51(15): 159501-1-159501-2, Mar. 20, 2018.
Wang et al. "From Hydrophilicity to Hydrophobicity: A Critical Review—Part II: Hydrophobic Conversion", Wood and Fiber Science, 43(1): 41-56, Jan. 21, 2011.
Xu et al. "Manufacture And Properties Of Low-Density Binderless Particleboard From Kenaf Core", Journal of Wood Science, 50:62-67, Feb. 2004.
Zhao et al. "A Novel Eco-Friendly Wood Adhesive Composed by Sucrose and Ammonium Dihydrogen Phosphate", Polymers, 10(11): 1251-1-1251-14, Published Online Nov. 12, 2018.
Request for Examination and Search Report Dated Oct. 23, 2024 From the (ROSPATENT), The Federal Service for Intellectual Property, Patents and Trademarks of the Russian Federation Re. Application No. 2022133619. (7 Pages).
English Translation Dated Oct. 30, 2024 of the Request for Examination and Search Report Dated Oct. 23, 2024 From the (ROSPATENT), The Federal Service for Intellectual Property, Patents and Trademarks of the Russian Federation Re. Application No. 2022133619. (4 Pages).
Relatório de Busca e Parecer [Search Report and Opinion] Dated Apr. 15, 2025 From the Serviço Público Federal, Ministério da Economia, Instituto Nacional da Propriedade Industrial do Brasil Re. Application No. BR1120220248547 and Its Translation Into English. (7 Pages).
Supplementary European Search Report and the European Search Opinion Dated Jan. 14, 2025 From the European Patent Office Re. Application No. 21821201.7. (10 Pages).
Requisition by the Examiner Dated Jun. 10, 2026 From the Innovation, Science and Economic Development Canada, Canadian Intellectual Property Office Re. Application No. 3,184,444. (3 Pages).

* cited by examiner

METHOD OF PREPARING PLANT-DERIVED MATERIAL

RELATED APPLICATION/S

This application is a National Phase of PCT Patent Application No. PCT/IL2021/050680 having International filing date of Jun. 7, 2021 which claims the benefit of priority under 35 USC § 119(e) of U.S. Provisional Patent Application No. 63/035,787 filed on Jun. 7, 2020. The contents of the above applications are all incorporated by reference as if fully set forth herein in their entirety.

FIELD AND BACKGROUND OF THE INVENTION

The present invention, in some embodiments thereof, relates to materials science, and more particularly, but not exclusively, to methods of preparing plant-derived materials, such as fiberboard.

Fiberboard is a type of engineered wood product that is made out of wood fibers, and may be categorized as particle board (a.k.a. chipboard, low-density fiberboard or LDF), medium-density fiberboard (MDF), and hardboard (a.k.a. high-density fiberboard or HDF). The density of particle board is typically 160-450 kg/m$^3$, whereas the density of MDF is typically 500-1000 kg/m$^3$, commonly 600-800 kg/m$^3$. Besides wood fibers, fiberboard may comprise fibers from sources such as straw, bamboo, rice husks, and recycled paper.

Various kinds of fiberboard are currently manufactured from wood chips, typically obtained by cutting and sorting fresh or recycled wood material to small pieces of similar size. For MDF, chips are then steamed to soften them for defibration. A small amount of paraffin wax is added to the steamed chips and they are transformed into fluffy fibers in a defibrator, and soon afterwards sprayed with an adhesive such as urea-formaldehyde (UF) resin, melamine-formaldehyde (MF) resin, polyurethane resin, epoxy resin or phenol formaldehyde (PF) resin. The wax prevents fibers from clumping together during storage. For particle board, the chips are sprayed with a suitable adhesive. The fibers or chips are then arranged into a uniform "mat" on a conveyor belt. This mat is pre-compressed and then hot-pressed.

Hardboard is typically prepared from exploded wood fibers that have been highly compressed, resulting in a density of 500 kg/m$^3$ or more, usually 800-1040 kg/m$^3$. This process requires no additional adhesive (although resin is often added), as the lignin of the wood fibers bonds the hardboard together.

Concerns have been raised about the safety of adhesives commonly used for manufacturing fiberboard, for example, due to release of toxic chemicals (e.g., formaldehyde). Substances proposed as safer, alternative adhesives include natural latex [Nakanishi et al., *J Clean Prod* 2018, 195: 1259-1269], gum Arabic [Abuarra et al., *Mater Des* 2014, 60:108-115], alkaline-treated soybean protein concentrate [Cinnamea et al., *Bioresour Technol* 2010, 101:818-825], gluten [Khosravi et al., *Ind Crops Prod* 2010, 32:275-283], urea-oxidized starch [Zhao et al., *Carbohydr Polym* 2018, 181:1112-1118], and glutaraldehyde-modified cassava starch [Akinyemi et al., *Case Studies in Construction Materials* 2019, 11: e00236].

Plasma treatment has been used to form a hydrophobic film on wood from relatively nonpolar compounds such as hexamethyldisiloxane (HDMSO), SF6, ethylene, acetylene, butane and vinyl acetate [Wang & Piao, *Wood and Fiber Sci* 2011, 43:41-56; Kim et al., *J Nanomaterials* 2013, 2013: 138083].

Plasma treatment may also be used to increase the wetting properties of wood for subsequent treatments for enhancing the properties of a wood surface or composite material, or for improving adhesion [Peters et al., *J Phys D Appl Phys* 2017, 50:475206].

Acda et al. [*Int J Adhesion Adhesives* 2012, 32:70-75] describes the use of oxygen plasma to improve adhesion of phenol-formaldehyde, urea-formaldehyde and polyurethane coating to wood.

U.S. Pat. No. 6,818,102 describes a method for modifying wooden surfaces by electrical discharges at atmospheric pressure, which may be utilized to enhance the bond of the wooden surface to coatings or adhesives.

SUMMARY OF THE INVENTION

According to an aspect of some embodiments of the invention, there is provided a method of preparing a fiberboard, the method comprising treating a particulate plant-derived material with plasma to obtain a plasma-treated particulate material, and compressing the plasma-treated particulate material, to thereby obtain the fiberboard.

According to an aspect of some embodiments of the invention, there is provided a fiberboard prepared according to a method described herein.

According to an aspect of some embodiments of the invention, there is provided a fiberboard comprising a particulate plant-derived material, and being substantially devoid of an adhesive.

According to an aspect of some embodiments of the invention, there is provided a fiberboard comprising a particulate plant-derived material, and being substantially devoid of an adhesive selected from the group consisting of urea-formaldehyde resin, melamine-formaldehyde resin, polyurethane resin, epoxy resin, and phenol formaldehyde resin.

According to an aspect of some embodiments of the invention, there is provided a fiberboard comprising a particulate plant-derived material, and being substantially devoid of an adhesive, wherein a density of the fiberboard is less than 500 kg/m$^3$.

According to an aspect of some embodiments of the invention, there is provided a fiberboard comprising a particulate plant-derived material, and being substantially devoid of an adhesive selected from the group consisting of urea-formaldehyde resin, melamine-formaldehyde resin, polyurethane resin, epoxy resin, and phenol formaldehyde resin, wherein a density of the fiberboard is less than 500 kg/m$^3$.

According to an aspect of some embodiments of the invention, there is provided a fiberboard comprising a particulate plant-derived material, and being substantially devoid of an adhesive, wherein the particulate plant-derived material is characterized by a particle area of at least 1 mm$^2$.

According to an aspect of some embodiments of the invention, there is provided a fiberboard comprising a particulate plant-derived material, and being substantially devoid of an adhesive selected from the group consisting of urea-formaldehyde resin, melamine-formaldehyde resin, polyurethane resin, epoxy resin, and phenol formaldehyde resin, wherein the particulate plant-derived material is characterized by a particle area of at least 1 mm$^2$.

According to an aspect of some embodiments of the invention, there is provided a fiberboard comprising a particulate plant-derived material, and being substantially devoid of an adhesive, wherein the particulate plant-derived material is characterized by a water contact angle of no more than 20°.

According to an aspect of some embodiments of the invention, there is provided a fiberboard comprising a particulate plant-derived material, and being substantially devoid of an adhesive selected from the group consisting of urea-formaldehyde resin, melamine-formaldehyde resin, polyurethane resin, epoxy resin, and phenol formaldehyde resin, wherein the particulate plant-derived material is characterized by a water contact angle of no more than 20°.

According to some of any of the embodiments described herein relating to a method, the compressing of the plasma-treated particulate material is effected in the absence of an adhesive.

According to some of any of the embodiments described herein relating to a method, the compressing of the plasma-treated particulate material is effected in the absence of an adhesive selected from the group consisting of urea-formaldehyde resin, melamine-formaldehyde resin, polyurethane resin, epoxy resin, and phenol formaldehyde resin.

According to some of any of the embodiments described herein relating to a method, the compressing is effected at a pressure of at least 100 $kg/cm^2$.

According to some of any of the embodiments described herein relating to a method, the compressing is effected at a temperature of at least 100° C.

According to some of any of the embodiments described herein relating to a method, the compressing is effected for at least 10 minutes.

According to some of any of the embodiments described herein relating to a method, the method further comprising cladding at least a portion of at least one surface of the fiberboard with a layer of a polymer.

According to some of any of the embodiments described herein, at least a portion of the particulate plant-derived material of the fiberboard is plasma-treated.

According to some of any of the embodiments described herein, the plasma is selected from the group consisting of a corona discharge plasma, a dielectric barrier discharge plasma, and a radiofrequency inductive plasma.

According to some of any of the embodiments described herein, the plasma comprises oxygen plasma and/or nitrogen plasma.

According to some of any of the embodiments described herein, the plasma is an air plasma.

According to some of any of the embodiments described herein, the particulate material of the fiberboard is characterized by a water contact angle of no more than 20°.

According to some of any of the embodiments described herein, the plasma-treated particulate material is characterized by a water contact angle of no more than 20°.

According to some of any of the embodiments described herein, a normalized maximal stiffness of the fiberboard perpendicular to the plane of the fiberboard is at least 15,000 $N/m^2$.

According to some of any of the embodiments described herein, the normalized maximal stiffness perpendicular to the plane of the fiberboard is at least 76,000 $N/m^2$.

According to some of any of the embodiments described herein, a normalized maximal stiffness of the fiberboard parallel to the plane of the fiberboard is at least 600,000 $N/m^2$.

According to some of any of the embodiments described herein, the normalized maximal stiffness parallel to the plane of the fiberboard is at least 1,630,000 $N/m^2$.

According to some of any of the embodiments described herein, the fiberboard is clad with a layer of polymer on at least a portion of at least one surface thereof.

According to some of any of the embodiments described herein, the particulate plant-derived material is characterized by a particle area of at least 1 $mm^2$.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
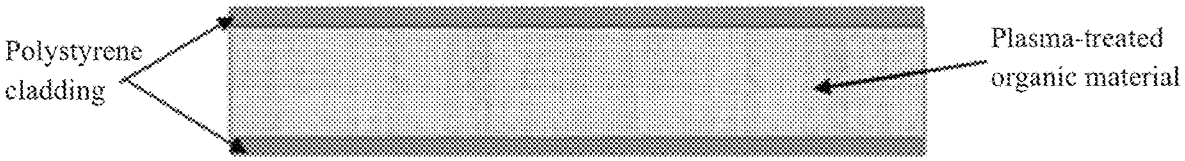
FIG. 1 is a schematic depiction of a plasma-treated material twin-cladded with polystyrene, according to some embodiments of the invention.

The present invention, in some embodiments thereof, relates to materials science, and more particularly, but not exclusively, to methods of preparing plant-derived materials, such as fiberboard.

Before explaining at least one embodiment of the invention in detail, it is to be understood that the invention is not necessarily limited in its application to the details set forth in the following description or exemplified by the Examples. The invention is capable of other embodiments or of being practiced or carried out in various ways.

Adhesives normally used in fiberboard, such as urea-formaldehyde (UF) or phenol formaldehyde resin (PF) resins, tend to be costly and toxic. For example, formaldehyde-based resins may release potentially harmful amounts of formaldehyde (and phenol formaldehyde resin may also release phenol); and various resins may release potentially harmful amounts of cyanide and/or isocyanates.

The present inventors have surprisingly uncovered that plasma treatment of the component particles of fiberboard (followed by compression) may be used as an alternative to a chemical adhesive, thereby allowing the reducing and even elimination of such adhesives in fiberboard. In addition, the method is simple (involving few steps) and does not waste material.

The present invention is applicable to a wide variety of materials, especially lignocellulosic biomass; and thus may utilize waste materials derived from agriculture and industrial processes. While reducing the present invention to practice, the inventors have utilized diverse plant-derived materials such as wood chips from palm trees, cannabis (hemp fibers), and sawdust.

Fiberboard:

According to an aspect of some embodiments of the invention, there is provided a fiberboard comprising a particulate plant-derived material, and optionally consisting essentially of a particulate plant-derived material.

Herein, the term "fiberboard" encompasses any manufactured solid material (including, e.g., particle board, hardboard and oriented strand board) comprising, as a major component, multiple particles (e.g., fibers, flakes, wood chips, shavings and/or powder grains) of a plant-derived material joined together, wherein each dimension of the fiberboard comprises multiple particles of the plant-derived material along its length. The plant-derived material may comprise lignin and/or cellulose as a structural component.

The fiberboard may be formed, for example, from individual fibers, such as wood fibers (e.g., as in medium-density and/or high-density fiberboard); and/or wood strands (flakes), wood chips, shavings and/or sawdust (e.g., as in particle board or oriented strand board).

The plant-derived material may optionally comprise wood (e.g., in particulate form); that is, a composite of cellulose and lignin, typically obtained from the stem and/or root of trees. Particulate forms of wood include, without limitation, wood fibers, wood flakes, wood chips, wood shavings and/or sawdust.

Alternatively or additionally, the plant-derived material may comprise a material other than wood. Examples of plant-derived materials other than wood which may be used (e.g., in particulate form) in embodiments of the invention include, bast fibers (e.g., from plants such as flax, cannabis (hemp), jute, ramie and other nettles, esparto, dogbane, hoopvine, kenaf, beans, linden, wisteria, mulberry tree and/or papyrus plant); leaf fibers (e.g., from plants such as abaca, sisal, bowstring hemp, henequen, phormium and/or yucca); seed and/or fruit fibers (e.g., from plants such as coconut (coir), cotton, kapok, milkweed, and/or luffa); straw and/or husks (e.g., from cereal crops such as wheat, rye, oat and/or rice); sugar cane residue; bamboo fibers; and paper (e.g., waste paper for recycling). Such non-wood materials are commonly rich in cellulose.

Without being bound by any particular theory, it is believed that the diversity of plant-derived materials which may be used in embodiments of the invention may allow a practitioner to select low-cost and/or readily available materials; for example, waste materials (e.g., from agriculture and/or industrial sources), such as (without limitation) wood shavings, sawdust, products (e.g., wood or paper products) collected for recycling, pruned plant parts, and/or residues (e.g., plant parts not utilized in the main product) of crops such as cannabis, sugar cane, cotton, or cereal crops (e.g., straw, husks, corn stalks).

In some of any of the embodiments described herein, the fiberboard is substantially devoid of an adhesive.

Herein, the term "adhesive" refers to any substance added to the particulate plant-derived material described herein which promotes adhesion between particles of the plant-derived material (particulate materials derived from plants are excluded from the definition of "adhesive").

In some of any of the respective embodiments described herein, the adhesive is a polymer (e.g., synthetic polymer), referred to herein interchangeably as a "resin". The polymer may optionally be a thermosetting polymer (which may optionally be added in a monomeric form which polymerizes following application) and/or a thermoplastic polymer.

Examples of adhesives, which a fiberboard according to some embodiments described herein is substantially devoid of, include, without limitation, urea-formaldehyde resin, melamine-formaldehyde resin, polyurethane resin, epoxy resin, and/or phenol formaldehyde resin.

Herein throughout, the phrase "substantially devoid of" refers to a concentration of less than 1 weight percent, and optionally less than 0.1 weight percent, optionally less than 0.01 weight percent, optionally less than 0.001 weight percent, and optionally less than 0.0001 weight percent.

In some of any of the embodiments described herein, at least a portion of the particulate plant-derived material is plasma-treated.

A plasma-treated material may optionally be characterized by an increase in a particular type of atom or functional group on a surface of a material, relative to a corresponding untreated material. For example, the plasma-treated particulate plant-derived material obtained using an oxygen-containing and/or nitrogen-containing plasma may exhibit an increase in concentration of oxygen and/or nitrogen atoms at the surface of particles (as compared to untreated particulate plant-derived material).

In some of any of the respective embodiments described herein, the plasma-treated material is characterized by a high degree of hydrophilicity.

Hydrophilicity of a surface is commonly measured by contact angle with water, referred to herein interchangeably as a "water contact angle". A contact angle ($\theta$) is the angle at which a subject liquid (e.g., water) interfaces the surface and is determined by the adhesive and cohesive forces of the liquid. As the tendency of a drop to spread out over a surface increases, the contact angle decreases and vice versa. Thus, the contact angle provides an inverse measure of hydrophilicity or wettability.

In some of any of the embodiments described herein, a plasma-treated material (e.g., individual particles thereof) is characterized by water contact angle of no more than 20°. In some embodiments, the water contact angle of no more than 15°. In some embodiments, the water contact angle of no more than 10°. In some embodiments, the water contact angle of no more than 5°.

In some of any of the embodiments described herein, a plasma-treated material (e.g., individual particles thereof) is characterized by complete wetting by water (which may be regarded as equivalent to a contact angle of 0°.

Herein, the term "contact angle" encompasses apparent contact angles, which are determined by measurement, and contact angles calculated based on other parameters (e.g., via the Young equation).

In preferred embodiments, the contact angle is an equilibrium contact angle.

In some embodiments, the contact angle is an apparent contact angle, determined by measurement. When a liquid droplet is placed on a solid surface (e.g., a plasma treated substance according to any of the respective embodiments described herein), determination of the contact angle is relatively straightforward, using standard techniques used in the art.

The Young equation defines the contact angle $\theta$ by the relationship: $\gamma_{SG}=\gamma_{SL}+\gamma_{LG}\cdot\cos\theta$, where $\gamma_{SG}$ is the surface energy at the solid-gas interface, $\gamma_{LG}$ is the surface tension at the liquid-gas interface, and $\gamma_{SL}$ is the surface tension at the solid-gas interface. When $\gamma_{SG}>\gamma_{SL}+\gamma_{LG}$, there is no mathematical solution to the equation, and the solid undergoes complete wetting at equilibrium (i.e., there is no equilibrium contact angle).

The Young equation may optionally be used to determine a contact angle based on known (e.g., experimentally determined) surface energies or to calculate a surface energy based on a known (e.g., experimentally determined) contact angle, e.g., wherein the liquid is water. The gas is optionally air at a pressure of 1 atmosphere.

In some of any of the embodiments described herein, a density of the fiberboard is less than 500 kg/$m^3$. In some such embodiments, the density is no more than 450 kg/$m^3$, for example, in a range of from 100 to 450 kg/$m^3$, or from 150 to 450 kg/$m^3$, or from 200 to 450 kg/$m^3$, or from 250 to 450 kg/$m^3$, or from 300 to 450 kg/$m^3$, or from 350 to 450 kg/$m^3$. In some embodiments, the density is no more than 400 kg/$m^3$, for example, in a range of from 100 to 400 kg/$m^3$, or from 150 to 400 kg/$m^3$, or from 200 to 400 kg/$m^3$, or from 250 to 400 kg/$m^3$, or from 300 to 400 kg/$m^3$. In some embodiments, the density is no more than 350 kg/$m^3$, for example, in a range of from 100 to 350 kg/$m^3$, or from 150 to 350 kg/$m^3$, or from 200 to 350 kg/$m^3$, or from 250 to 350 kg/$m^3$. In some embodiments, the density is no more than 300 kg/$m^3$, for example, in a range of from 100 to 300 kg/$m^3$, or from 150 to 300 kg/$m^3$, or from 200 to 300 kg/$m^3$. In some embodiments, the density is no more than 250 kg/$m^3$, for example, in a range of from 100 to 250 kg/$m^3$, or from 150 to 250 kg/$m^3$. In some embodiments, the density is no more than 200 kg/$m^3$, for example, in a range of from 100 to 200 kg/$m^3$.

Without being bound by any particular theory, it is believed that fiberboard having a relatively low density (e.g., less than 500 kg/$m^3$) is more difficult to obtain without relying on adhesives, as the voids associated with the low density reduce the opportunities for binding between particles.

In some of any of the embodiments described herein, the particulate plant-derived material in the fiberboard is characterized by a particle area of at least 1 $mm^2$, optionally at least 3 $mm^2$, optionally at least 10 $mm^2$, optionally at least 30 $mm^2$, and optionally at least 100 $mm^2$.

In some of any of the embodiments described herein, the particulate plant-derived material in the fiberboard is characterized by a particle area of no more than 300 $mm^2$ (e.g., from 1 to 300 $mm^2$), or no more than 100 $mm^2$ (e.g., from 1 to 100 $mm^2$), or no more than 30 $mm^2$ (e.g., from 1 to 30 $mm^2$), or no more than 10 $mm^2$ (e.g., from 1 to 10 $mm^2$), or no more than 3 $mm^2$ (e.g., from 1 to 3 $mm^2$).

Herein, the term "particle area" refers to the area of the largest cross-section of a particle. For a particulate material with particles of different size, the particle area is an average of the particle area of individual particles, e.g., a mass-weighted average of the particle areas.

The fiberboard according to any of the embodiments described herein may optionally be characterized by a maximal stiffness, and optionally a normalized maximal stiffness.

Herein, the term "maximal stiffness" refers to a ratio $F_{max}/d_{max}$, wherein $\delta_{max}$ is the maximal displacement upon application of a force in an indicated direction (e.g., parallel or perpendicular to the plane of a fiberboard sample) before the sample undergoes complete detachment (e.g., tearing upon application of a tensile force in a parallel direction, or breaking upon application of a tensile force in a perpendicular), and $F_{max}$ is the force at maximal displacement.

Herein, the term "normalized maximal stiffness" refers to a maximal stiffness (as defined herein) divided by a thickness of a sample (e.g., in a direction perpendicular to the plane of the sample).

In some of any of the embodiments described herein, a normalized maximal stiffness of the fiberboard perpendicular to the plane of the fiberboard is at least 10,000 N/$m^2$, optionally at least 15,000 N/$m^2$, optionally at least 20,000 N/$m^2$, optionally at least 30,000 N/$m^2$, optionally at least 40,000 N/$m^2$, optionally at least 50,000 N/$m^2$, optionally at least 60,000 N/$m^2$, optionally at least 76,000 N/$m^2$, and optionally at least 100,000 N/$m^2$.

In some of any of the embodiments described herein, a normalized maximal stiffness of the fiberboard parallel to the plane of the fiberboard is at least 400,000 N/$m^2$, optionally at least 600,000 N/$m^2$, optionally at least 800,000 N/$m^2$, optionally at least 1,000,000 N/$m^2$, optionally at least 1,200,000 N/$m^2$, optionally at least 1,400,000 N/$m^2$, optionally at least 1,630,000 N/$m^2$, and optionally at least 2,000,000 N/$m^2$.

In some of any of the embodiments described herein, a normalized maximal stiffness of the fiberboard perpendicular to the plane of the fiberboard is at least 76,000 N/$m^2$ (according to any of the respective embodiments described herein), and a normalized maximal stiffness of the fiberboard parallel to the plane of the fiberboard is at least 1,630,000 N/$m^2$ (according to any of the respective embodiments described herein).

Alternatively or additionally, the fiberboard according to any of the embodiments described herein may optionally be characterized by a modulus of rupture (MOR) and/or a modulus of elasticity (MOE), as determined according to techniques known in the art, e.g., according to the standards EN 312:2003 and/or ANSI A208.1.

In some of any of the embodiments described herein, an MOE of the fiberboard is at least 1800 MPa, optionally at least 2050 MPa (e.g., according to EN 312:2003), optionally at least 2400 MPa (e.g., according to ANSI A208.1), optionally at least 2800 MPa, and optionally at least 3200 MPa.

In some of any of the embodiments described herein, an MOR of the fiberboard is at least 12 MPa, optionally at least 14 MPa, optionally at least 15 MPa (e.g., according to EN 312:2003), optionally at least 16.5 MPa (e.g., according to ANSI A208.1), optionally at least 18 MPa, optionally at least 20 MPa, optionally at least 25 MPa, and optionally at least 30 MPa.

The fiberboard of embodiments of the invention may optionally be in a form of a fiberboard per se, or may be clad with a layer of polymer on at least a portion of at least one surface thereof. For example, the fiberboard may optionally be a single-cladded (having a polymer layer on a single surface thereof) or twin cladded (having a polymer layer on opposite sides thereof). Polystyrene is an exemplary polymer for cladding.

Alternatively or additionally, a veneer (thin slice) of wood may be glued to one or more surface of the fiberboard (according to any of the embodiments described herein), for example, to strengthen the fiberboard, and/or to improve the aesthetics of the fiberboard (e.g., by providing an appearance of conventional wood).

It is to be appreciated that substances such as a polymer layer or wood veneer attached to the fiberboard are not considered a part of the fiberboard when determining fiberboard properties described herein (e.g., density, particle size, stiffness, and the like).

In some of any of the respective embodiments described herein, the fiberboard is obtainable by a method according to any of the respective embodiments described herein.

According to an aspect of some embodiments of the invention, there is provided an article of manufacture comprising fiberboard according to any of the respective embodiments described herein.

The article of manufacture comprising fiberboard may optionally comprise, for example, furniture (e.g., a chair, a stool, a bench, a sofa, a bed, a cradle, a table, a desk, a cupboard, a cabinet, a shelf, a bookcase, a drawer, a chest, a countertop, and/or ready-to-assemble furniture) or a portion thereof (e.g., a frame), construction material (e.g., a scaffold, a door, a roof and/or a floor) or a portion thereof (e.g., a floor underlayment and/or a sound-proofing layer), a home appliance (e.g., a cooking appliance and/or an electrical appliance) or a portion thereof (e.g., a handle), and/or vehicle component (e.g., a door, a dashboard, and/or a rear shelf) or a portion thereof (e.g., an inner door shell).

The article of manufacture may optionally comprise an additional material (e.g., wood and/or synthetic polymer) coating at least a portion of the surface of the fiberboard.

For example, the article of manufacture may optionally comprise a veneer of wood attached (e.g., glued) to at least a portion (e.g., a visible portion) of a surface of the fiberboard, e.g., in order to enhance aesthetics.

Alternatively or additionally, for applications involving contact with moisture (e.g., outdoor applications and/or kitchen applications), the fiberboard is optionally coated with a water-resistant material, such as a water-resistant polymer (e.g., melamine resin laminate and/or polyvinyl chloride).

Method or Preparation:

According to an aspect of some embodiments of the invention, there is provided a method of preparing a fiberboard (e.g., a fiberboard according to any of the respective embodiments described herein). The method comprises treating a particulate plant-derived material (according to any of the respective embodiments described herein) with plasma to obtain a plasma-treated particulate material, and compressing the plasma-treated particulate material.

The particulate plant-derived material may optionally be provided in a particulate form (e.g., sawdust), or optionally a plant-derived material is provided in a form (e.g., lumber) which is then comminuted (e.g., by crushing, grinding, cutting, and/or shredding) to form the particulate plant-derived material. In addition, a particulate plant-derived material may optionally be obtained in a particulate form which is then comminuted (e.g., by crushing, grinding, cutting, and/or shredding) and/or sorted to obtain a particulate plant-derived material with a desired particle size; for example, wherein wood chips are shredded to obtain smaller wood chips, and/or defibrated to obtain wood fibers.

The final particle size of the material subjected to plasma treatment is optionally according to any of the embodiments described herein regarding particle size in fiberboard.

Herein and in the art, the term "plasma" describes a gas that has been at least partially ionized. Plasma is considered to consist of a mixture of neutral atoms, atomic ions, electrons, molecular ions, and molecules present in excited and ground states and carrying a high amount of internal energy. Plasma is typically generated by subjecting a gas or a gas mixture to elevated heat or to strong electromagnetic field. Most plasma systems use AC electrical power source and operate at low audio-, radio- or microwave-frequency.

When plasma interacts with a surface, "plasma treatment" is initiated.

The effect of a plasma treatment is typically controlled by selecting plasma parameters such as the gas mixture from which the plasma is generated, the electric power and energy frequency used to generate the plasma, the plasma's temperature, and the pressure at which the plasma is generated. Additional classifying parameters include, for example, exposure time and electron densities.

A number of gases can be used for generating a plasma, including, but not limited to, air, argon, hydrogen, helium, nitrogen, oxygen, steam, CO, and $CO_2$, and mixtures thereof.

In some embodiments, the gas used to generate plasma comprises nitrogen and/or oxygen. Air is an exemplary gas for generating plasma.

Without being bound by any particular theory, it is believed that a plasma comprising nitrogen and/or oxygen results in introduction of nitrogen and/or oxygen atoms at a surface of the treated material, and that such atoms contribute more to adhesion of particles than do products of gases such as hydrocarbons, siloxanes, fluorine-containing gases, and inert elements such as argon and helium.

Plasma is often classified by its temperature, that is, as thermal, or hot, plasma or as non-thermal, or cold, plasma.

In thermal plasma typically the gas in nearly fully ionized, whereby in cold plasma the gas is only partially ionized, namely, less than 10%, or less than 5% or about 1% and even less of the gas is ionized.

Cold plasma is preferred according to some embodiments of the invention. Cold plasma is relatively easy to handle and can be readily applied to a material (e.g., a plant-derived material described herein) without excessive heating.

Plasma is also often classified by the pressure at which it is generated (discharged), and can be a low-pressure plasma discharge, an atmospheric-pressure plasma discharge or a high-pressure plasma discharge.

Low pressure, or vacuum, plasma generation and treatment are conducted in a controlled environment inside a sealed chamber, which is maintained at a medium vacuum, usually 2-12 mbar. The gas is typically energized by an electrical high frequency field. When the chamber is filled with activated plasma all surfaces of a treated objects are reached.

A typical set up of low-pressure plasma treatment comprises a sealed chamber, a pair of electrodes (a cathode and an anode) electrically connected to an electric power source, and a sample to be treated. A vacuum is typically generated in the chamber by means of a pump and a valve. The gas or gas mixture enters the chamber through a gas inlet and a valve, and an electromagnetic field is applied, to thereby generate plasma.

Atmospheric-pressure plasma treatment is conducted in a plasma chamber in which the pressure approximately matches that of the surrounding atmosphere, or in an open chamber. Common atmospheric-pressure plasmas include plasma generated by AC excitation (e.g., corona discharge and/or dielectric barrier discharge) and plasma torches and jets.

Corona discharge plasma forms by ionization of a fluid such as air in the vicinity of an electrically charged conductor, in the presence of a sufficiently high potential gradient (e.g., a high gradient associated with a sharp point of a charged conductor).

Dielectric barrier discharge plasma is generated between electrodes separated by an insulating, for example, in the form of plasma filaments linking a pair of electrodes.

Plasma torch and plasma jet technology involves creation of plasma in an enclosed chamber. Gas flow carries the plasma through a jet head towards the surface of the material to be treated.

Plasma jet technology commonly involves the use of a high-voltage discharge (e.g., between 5 and 15 kV in the frequency range of 10 to 100 kHz) to create a pulsed electric charge in an enclosed chamber. A gas is then allowed to flow through the discharge section to form the plasma (e.g., a cold plasma). Plasma torch technology typically involves thermal plasma generated by direct current or alternating current.

In some of any of the embodiments described herein, exposing the particulate plant-derived material to a plasma treatment as described herein is effected during a time period of at least 10 seconds, for example from 10 seconds to 20 minutes (1200 seconds), or from 10 to 600 seconds, or from 10 to 300 seconds. In some such embodiments, the time period is at least 30 seconds, for example, from 30 seconds to 20 minutes (1200 seconds), or from 30 to 600 seconds, or from 30 to 300 seconds. In some embodiments, the time period is at least 1 minute, for example, from 1 to 20 minutes, or from 1 to 10 minutes, or from 1 to 5 minutes. In some embodiments, the time period is at least 2 minutes, for example, from 2 to 20 minutes, or from 2 to 10 minutes, or from 2 to 5 minutes. Shorter (e.g., less than 10 seconds, for example, a few seconds or less) and longer time periods are also contemplated, depending on the particulate material to be treated, the type of plasma treatment and the desired properties of the fiberboard.

In some of any of the embodiments of the present invention, the plasma treatment is effected upon generating the plasma by application of an electromagnetic field, as described herein. In some embodiments, the electromagnetic field is applied at a radio-frequency (RF) energy. In some embodiments, the plasma is generated at frequency in a range of from 1 to 200 MHz, or 1 to 100 MHz, or 1 to 50 MHz, or 10 to 50 MHz, or optionally from 10 to 20 MHz, including any subranges and intermediate values therebetween. The power of the radio-frequency (according to any of the respective embodiments described herein) is optionally in a range of from 1 W to 100 W, and optionally in a range of from 5 W to 50 W (e.g., applied for a time period according to any of the respective embodiments described herein).

In some of any of the embodiments of the present invention, the plasma treatment is effected upon generating the plasma by application of a high voltage (alternating or non-alternating current), for example, by glow discharge, electric arcing and/or corona discharge. The application of high voltage may be continuous or comprise repeated brief discharges (for example, at a rate of at least 1 kHz, optionally at least 10 kHz, and optionally in a range of from 10 to 100 kHz). The high voltage is optionally at least 1 kV, optionally from 1 to 50 kV, optionally at least 5 kV, and optionally in a range of from 5 to 15 kV, including any subranges and intermediate values therebetween.

In some of any of the embodiments described herein, the plasma treatment is a low-pressure plasma treatment, and, in some embodiments, the plasma treatment comprises exposing the particulate plant-derived material to a low-pressure plasma discharge.

In some of these embodiments, the plasma is generated in a sealed vacuum chamber and the particulate material is exposed to the plasma treatment, optionally in the same sealed chamber. In some embodiments, the pressure in such a chamber is lower than 1000 Pa, for example, lower than 500 Pa, lower than 250 Pa, or lower than 150 Pa.

In some of these exemplary embodiments, the plasma is generated by application of an electromagnetic field, as described herein. In some embodiments, an electromagnetic field is applied at a radio-frequency (RF), for example, a frequency of from 10 to 20 MHz. The power of the radio-frequency is optionally in a range of from 5 W to 50 W, and optionally from 10 W to 30 W (e.g., applied for a time period according to any of the respective embodiments described herein).

In exemplary embodiments of RF plasma, the plasma treatment comprises RF inductive air plasma discharge, namely, the gas mixture is air, and the plasma is generated (via electromagnetic induction) by application of RF energy.

In some of these exemplary embodiments, the plasma treatment is a low-pressure plasma treatment effected at a pressure of from about 10 Pa to about 500 Pa, optionally from 20 Pa to 200 Pa, or from 50 Pa to 150 Pa (e.g., from 0.5 to 1 Torr).

In some of these exemplary embodiments, the plasma treatment is effected at a temperature of from 10° C. to 100° C., for example, at ambient temperature (e.g., in a range of from 20 to 25° C.).

In some of these embodiments, the particulate plant-derived material placed in a location comprising plasma (e.g., a plasma chamber) in a manner which separates particles of the particulate material from one another (e.g., by gradual introduction of particles and/or by applying a gas flow to the particulate material), thereby facilitating exposure of the particle surfaces to the plasma.

In some of any of the respective embodiments described herein, compressing the plasma-treated particulate material is effected in the absence of an adhesive.

In some of any of the respective embodiments described herein, compressing is effected in the absence of any of urea-formaldehyde resin, melamine-formaldehyde resin, polyurethane resin, epoxy resin, and phenol formaldehyde resin.

In some of any of the respective embodiments described herein, compressing is effected in the absence of any organic liquid (including, without limitation, organic solvents, molten thermoplastic polymers, and/or polymerizable liquids such as resins, particularly thermosetting resins).

In some of any of the respective embodiments described herein, compressing is effected in the absence of any additional solid or liquid substance intervening between the particles of the plasma-treated particulate material (e.g., such that the plasma-treated surfaces of the particles are in direct contact with one another).

In some of any of the respective embodiments described herein, compressing is effected by applying a pressure of at least 100 $kg/cm^2$ to the plasma-treated particulate material, for example, in a range of from 100 $kg/cm^2$ to 20,000 $kg/cm^2$, or from 100 $kg/cm^2$ to 10,000 $kg/cm^2$, or from 100 $kg/cm^2$ to 5,000 $kg/cm^2$, or from 100 $kg/cm^2$ to 3,000 $kg/cm^2$. In some such embodiments, the pressure is at least 300 $kg/cm^2$, for example, in a range of from 300 $kg/cm^2$ to 20,000 $kg/cm^2$, or from 300 $kg/cm^2$ to 10,000 $kg/cm^2$, or from 300 $kg/cm^2$ to 5,000 $kg/cm^2$, or from 300 $kg/cm^2$ to 3,000 $kg/cm^2$. In some embodiments, the pressure is at least 1,000 $kg/cm^2$, for example, in a range of from 1,000 $kg/cm^2$ to 20,000 $kg/cm^2$, or from 1,000 $kg/cm^2$ to 10,000 $kg/cm^2$, or from 1,000 $kg/cm^2$ to 5,000 $kg/cm^2$, or from 1,000 $kg/cm^2$ to 3,000 $kg/cm^2$. In some embodiments, the pressure is at least 2,000 $kg/cm^2$, for example, in a range of from 2,000 $kg/cm^2$ to 20,000 $kg/cm^2$, or from 2,000 $kg/cm^2$ to 10,000 $kg/cm^2$, or from 2,000 $kg/cm^2$ to 5,000 $kg/cm^2$.

In some embodiments, the pressure is at least 3,000 $kg/cm^2$, for example, in a range of from 3,000 $kg/cm^2$ to 20,000 $kg/cm^2$, or from 3,000 $kg/cm^2$ to 10,000 $kg/cm^2$, or from 3,000 $kg/cm^2$ to 5,000 $kg/cm^2$. In some embodiments, the pressure is at least 4,000 $kg/cm^2$, for example, in a range of from 4,000 $kg/cm^2$ to 20,000 $kg/cm^2$, or from 4,000 $kg/cm^2$ to 10,000 $kg/cm^2$.

In some of any of the respective embodiments described herein, compressing is effected at an elevated temperature, for example, at a temperature of at least 50° C. (e.g., in a range of from 50° C. to 200° C., or from 50° C. to 150° C., or from 50° C. to 100° C.), optionally at a temperature of at least 100° C. (e.g., in a range of from 100° C. to 200° C., or from 100° C. to 175° C., or from 100° C. to 150° C.), optionally at a temperature of at least 125° C. (e.g., in a range of from 125° C. to 225° C., or from 125° C. to 200° C., or from 125° C. to 175° C.), and optionally at a temperature of at least 150° C. (e.g., in a range of from 150° C. to 250° C., or from 150° C. to 225° C., or from 150° C. to 200° C.). An exemplary compression temperature is about 150° C.

In some of any of the respective embodiments described herein, compressing (e.g., at a pressure according to any of the respective embodiments described herein) is effected for at least 10 minutes, optionally at a temperature of at least 50° C. (according to any of the respective embodiments described herein), optionally at a temperature of at least 100° C. (according to any of the respective embodiments described herein), optionally at a temperature of at least 125° C. (according to any of the respective embodiments described herein), and optionally at a temperature of at least 150° C. (according to any of the respective embodiments described herein). In some such embodiments, compressing is effected for a period of from 10 to 120 minutes, or from 10 to 90 minutes, or from 10 to 60 minutes, or from 10 to 40 minutes.

In some of any of the respective embodiments described herein, compressing (e.g., at a pressure according to any of the respective embodiments described herein) is effected for at least 20 minutes, optionally at a temperature of at least 50° C. (according to any of the respective embodiments described herein), optionally at a temperature of at least 100° C. (according to any of the respective embodiments described herein), optionally at a temperature of at least 125° C. (according to any of the respective embodiments described herein), and optionally at a temperature of at least 150° C. (according to any of the respective embodiments described herein). In some such embodiments, compressing is effected for a period of from 20 to 120 minutes, or from 20 to 90 minutes, or from 20 to 60 minutes, or from 20 to 40 minutes.

In some of any of the respective embodiments described herein, compressing (e.g., at a pressure according to any of the respective embodiments described herein) is effected for at least 30 minutes, optionally at a temperature of at least 50° C. (according to any of the respective embodiments described herein), optionally at a temperature of at least 100° C. (according to any of the respective embodiments described herein), optionally at a temperature of at least 125° C. (according to any of the respective embodiments described herein), and optionally at a temperature of at least 150° C. (according to any of the respective embodiments described herein). In some such embodiments, compressing is effected for a period of from 30 to 120 minutes, or from 30 to 90 minutes, or from 30 to 60 minutes, or from 30 to 40 minutes.

In some of any of the respective embodiments described herein, the method further comprises forming a layered fiberboard, with a plurality of layers characterized by different properties, e.g., thereby combining the advantages of the different layers. For example, the fiberboard comprising a "sandwich" of two outer layers (e.g., selected to have desired mechanical properties, such as stiffness and/or strength) with an inner layer (e.g., selected for being low-cost and/or light-weight) may optionally be prepared. The different layers may be characterized, for example, by different sources (e.g., a relatively cheap waste material versus a stronger, but costlier, source of material such as high quality wood chips) and/or by different particle sizes or shapes (e.g., a crude particulate material versus smaller particles and/or fibers which require further processing to be obtained).

In such embodiments, the different layers may optionally be prepared as separate fiberboard samples (according to procedures described hereinabove) which are then joined by compression (e.g., under conditions according to any of the respective embodiments described herein). Alternatively or additionally, layers may be formed by placing providing different types of plasma-treated particulate material in a layered fashion (optionally as a gradient of two types of material) prior to compressing.

In some of any of the respective embodiments described herein, the method further comprises attaching a substance to a surface of the obtained fiberboard, for example, cladding at least a portion of at least one surface of the fiberboard with a layer of a polymer (according to any of the respective embodiments described herein), and/or a veneer of wood (according to any of the embodiments described herein).

According to an aspect of embodiments of the invention, there is provided a fiberboard obtainable according to any of the embodiments described herein relating to a method of preparing a fiberboard.

As used herein the term "about" refers to +10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non-limiting fashion.

Example 1

Figure 2:
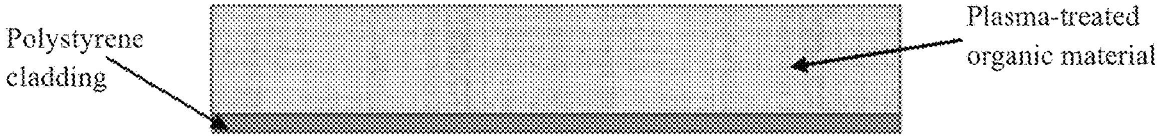
FIG. 2 is a schematic depiction of a plasma-treated material single-cladded with polystyrene, according to some embodiments of the invention.
Figure 3:
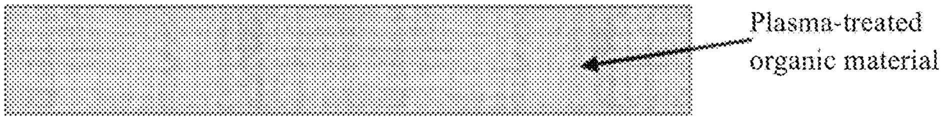
FIG. 3 is a schematic depiction of a non-cladded plasma-treated material, according to some embodiments of the invention.

Adhesive-Free Fiberboard Prepared by Plasma Treatment of Palm-Derived Material Waste material derived from palm trees (palm chips) was shredded to form thin flakes, and the shredded material was treated with a corona plasma discharge over the course of 0.5-3 minutes. Fiberboard free of polymeric binder was then prepared from the plasma-treated material by applying pressure (1, 2, 3 or 4 tons per $cm^2$ for 30-40 minutes at a temperature of 150° C. Fiberboard samples were prepared in three forms: twin-cladded (as depicted in FIG. 1), single-cladded (as depicted in FIG. 2) and non-cladded (as depicted in FIG. 3), using polystyrene as a cladding material.

The mechanical properties of the obtained fiberboard samples were determined by a tension test using a maximal stiffness parameter, calculated according to the following equation: $F_{max}/\delta_{max}$, wherein $\delta_{max}$ is the maximal displacement before the sample undergoes complete detachment, and $F_{max}$ is the force at maximal displacement. Stiffness was determined both for force parallel to the plane of the sample, which may be regarded as resistance to tearing; as well as for force perpendicular to the planer of the sample, which may be regarded as resistance to breaking. The mechanical properties of the fiberboard portion of exemplary polystyrene-clad fiberboard samples were calculated by subtracting the stiffness of a polystyrene sample from the total stiffness of the polystyrene-clad fiberboard sample. The mechanical properties of the fiberboard in exemplary single-clad samples are summarized in Table 1.

TABLE 1

Maximal stiffness and maximal stiffness normalized to thickness in parallel and perpendicular directions of exemplary single-clad fiberboard samples prepared from palm waste

| | | | Parallel | | Perpendicular | |
|---|---|---|---|---|---|---|
| Sample | Pressure (tons) | Sample thickness (mm) | Maximal stiffness (N/m) | Maximal stiffness, normalized ($N/m^2$) | Maximal stiffness (N/m) | Maximal stiffness, normalized ($N/m^2$) |
| 1 | 2.0 | 5.2 | 670150 | 128875 | 21483 | 3255 |
| 2 | 3.0 | 5.3 | 2036450 | 699300 | 32323 | 6465 |
| 3 | 1.0 | 7.6 | 2893850 | 380770 | 65161 | 8688 |
| 2a | 3.0 | 3.1 | 2031350 | 655274 | 101839 | 19584 |
| 2b | 3.0 | 3.6 | 2570550 | 714042 | 83136 | 20784 |
| 5 | 2.0 | 5 | 2182650 | 436530 | 85420 | 17084 |
| 6 | 4.0 | 2.7 | 2741050 | 1015204 | 4453 | 1781 |
| 3a | 1.0 | 3 | 1334250 | 444750 | 14499 | 4833 |
| 2c | 3.0 | 6.2 | 3122150 | 501953 | 37957 | 6659 |

Example 2

Adhesive-Free Fiberboard Prepared by Plasma Treatment of Cannabis-Derived Material Fiberboard samples are prepared according to procedures similar to those described in Example 1, except that waste material from cannabis (e.g., from hemp fiber production) and/or sawdust is used instead of palm-derived waste material. The mechanical properties of obtained samples are determined as described hereinabove.

Example 3

Effect of Type of Plasma Treatment on Adhesive-Free Fiberboard

Fiberboard samples were prepared from palm-derived waste material according to procedures similar to those described in Example 1, except that dielectric barrier discharge plasma was used instead of corona discharge plasma was used. The mechanical properties of obtained samples are determined as described hereinabove.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of preparing a fiberboard, the method comprising treating a particulate plant-derived material with plasma to obtain a plasma-treated particulate material, and compressing said plasma-treated particulate material, to thereby obtain the fiberboard, wherein said compressing of said plasma-treated particulate material is effected in the absence of an additional solid or liquid substance.

2. The method of claim 1, wherein said compressing of said plasma-treated particulate material is effected in the absence of an adhesive.

3. The method of claim 1, wherein said compressing of said plasma-treated particulate material is effected in the absence of an adhesive selected from the group consisting of urea-formaldehyde resin, melamine-formaldehyde resin, polyurethane resin, epoxy resin, and phenol formaldehyde resin.

4. The method of claim 1, wherein said compressing is effected at a pressure of at least 100 $kg/cm^2$.

5. The method of claim 1, wherein said compressing is effected at a temperature of at least 100° C.

6. The method of claim 1, wherein said compressing is effected for at least 10 minutes.

7. The method of claim 1, wherein said plasma-treated particulate material is characterized by a water contact angle of no more than 20°.

8. The method of claim 1, wherein a normalized maximal stiffness of said fiberboard perpendicular to the plane of the fiberboard is at least 15,000 $N/m^2$.

9. The method of claim 1, wherein a normalized maximal stiffness of said fiberboard parallel to the plane of the fiberboard is at least 600,000 $N/m^2$.

10. The method of claim 1, further comprising cladding at least a portion of at least one surface of the fiberboard with a layer of a polymer.

11. The method of claim 1, wherein the particulate plant-derived material comprises wood.

12. The method of claim 11, wherein the particulate plant derived material is selected from wood fibers, wood flakes, wood chips, wood shavings and sawdust.

13. The method of claim 1, wherein the plant-derived material is selected from bast fibers, leaf fibers, seed and/or fruit fibers, straw and husks.

* * * * *